United States Patent [19]

Meziere, Sr.

[11] Patent Number: 5,788,220

[45] Date of Patent: Aug. 4, 1998

[54] LINEARLY ACTUATED GAS FLOW CONTROL ASSEMBLY

[76] Inventor: Gary C. Meziere, Sr., 7474 Henbane, Etiwanda, Calif. 91739

[21] Appl. No.: 663,937

[22] Filed: Jun. 14, 1996

[51] Int. Cl.$^6$ .............................. F16K 1/22; F16K 31/58
[52] U.S. Cl. ................................ 251/341; 251/305
[58] Field of Search .......................... 251/341, 304, 251/305

[56] References Cited

U.S. PATENT DOCUMENTS

| | | | |
|---|---|---|---|
| 4,110,057 | 8/1978 | McMurry et al. | 251/341 X |
| 5,056,557 | 10/1991 | Tervo | 251/308 X |

Primary Examiner—Kevin Lee
Attorney, Agent, or Firm—Leo R. Carroll

[57] ABSTRACT

This invention consists of a linearly operated gas vent assembly in which the dynamic range of gas flow is increased by use of a low drag actuator profile. The structure consists generally of a swivel vent module and a housing module, in which the swivel vent assembly regulates the volume flow of air and the housing module imparts spacial control over the direction of air flow. The swivel vent module comprises four sub-modules: a ball cylinder, an actuator cylinder, a valve disk, and an arrangement of hinging elements to rotate the disk. The ball cylinder is a cylindrical shell and constitutes an outer case of the swivel vent module. The outside surface of the ball cylinder is shaped as a segment of a sphere, with the inside surface being shaped as a straight cylinder and containing a circular seal grove. The actuator cylinder is a cylindrical shell with an outer diameter adapted to slidably conform to the inside of the ball cylinder. A ring seal applies pressure to the actuator cylinder so as to help maintain positioning of the actuator cylinder at locations between fully open and fully closed. A first end of the actuator cylinder has a flange extending radially outward from the longitudinal cylinder axis so as to form an actuator grip. The actuator grip also operates to stop further sliding motion of the actuator cylinder into the ball cylinder. A second end of the actuator cylinder forms an actuator pin support by means of a flange extending radially inward toward the longitudinal cylinder axis. A circular valve disk is adapted to fit inside the actuator cylinder and is hinged so as to open or close the air passage. The passageway is extended when the valve is lengthened.

14 Claims, 4 Drawing Sheets

LINEARLY ACTUATED GAS FLOW CONTROL ASSEMBLY

BACKGROUND OF THE INVENTION

1. Technical Field

This invention relates generally to apparatus and methods for venting gas into a enclosed compartment, and more particularly to a wall or ceiling mounted system in which gas flow is used within a closed moving vehicle for heating or cooling purposes.

2. Background Art

Many devices have been utilized for venting temperature controlled gases into an inhabited vehicle compartment such as an automobile interior or an aircraft cabin. The most common devices provide means of both directing and controlling the amplitude the exit air flow. This airflow is usually broadcast into the vehicle through swivelled nozzle or diffusing means which are directed by the user.

Early designs, such as that of British Pat. No. 742,236, utilized an air outlet with a disc-like opening in an air pipe or duct and a ring in the duct able to be screwed upwards and downwards in the axial direction. A ball, able to be turned in all directions, was supported in a ring with an inner mating face. A number of holes were disposed at different blowing angles on the ball, and as the ring was screwed upward, the holes were progressively shut off.

In U.S. Pat. No. 2,596,909, Mufich disclosed an air valve device in which the air is discharged through an annular opening formed between a conical element disposed in the discharge path and movable relatively to an annular constriction in the discharge passage of the valve to vary the opening and consequently the amount of air discharged. The annular discharge opening is varied or adjusted by fixedly mounting the conical element to the valve body at the end of the discharge passage which is mounted for longitudinal movement relative to the valve body. In the two embodiments shown, the volume of air discharged is varied by either sliding the element in which the discharge passage is formed, or by threadedly mounting the conical element to the valve body and rotating the element.

In U.S. Pat. No. 4,320,696 to Daniels et al, an air blowing outlet for air-conditioning systems has an inner ball able to be moved towards and away from a ball seat in a middle opening in a valve plate for controlling the rate of air outlet through this opening. It was also possible for the air direction to be radial. To this end the valve plate is able to be moved axially clear of the outlet, this opening a ring gap between it and the outlet. The plate is moved by the ball pushing against it, with the middle opening shut. In this design, the valve body could be moved further from the air outlet into the room. This approach was especially useful with servo motor driven designs with a limited straight-line range of motion, but it is relatively complex and expensive.

Although, some of the above inventions operate with a linear motion actuator which is able to completely close the air valve, all possess considerable obstructions to flow at the maximum flow position. Their dynamic airflow range therefore is therefor limited.

SUMMARY OF THE INVENTION

This invention consists of a linearly operated gas flow control assembly in which the dynamic range of gas flow is increased by use of a low drag actuator profile. The structure consists generally of a swivel vent module and a housing module, in which the swivel vent assembly regulates the volume flow of air and the housing module imparts spacial control over the direction of air flow.

The swivel vent module comprises four sub-modules: a ball cylinder, an actuator cylinder, a valve disk, and an arrangement of hinging elements to rotate the disk.

The ball cylinder is a cylindrical shell and constitutes an outer case of the swivel vent module. The outside surface of the ball cylinder is shaped as a segment of a sphere, with the inside surface being shaped as a straight cylinder and containing a circular seal grove.

The actuator cylinder is a cylindrical shell with an outer diameter adapted to slidably conform to the inside of the ball cylinder. A ring seal applies pressure to the actuator cylinder so as to help maintain positioning of the actuator cylinder at locations between fully open and fully closed. A first end of the actuator cylinder has a flange extending radially outward from the longitudinal cylinder axis so as to form an actuator grip. The actuator grip also operates to stop further sliding motion of the actuator cylinder into the ball cylinder. A second end of the actuator cylinder forms an actuator pin support by means of a flange extending radially inward toward the longitudinal cylinder axis.

A circular valve disk is adapted to fit inside the actuator cylinder and is hinged so as to open or close the air passage.

A cylindric housing module contains the swivel vent module; with its internal diameter providing sufficient clearance for substantially unrestricted relative movement. A top end of the housing module provides an external flange for mounting of the swivel vent assembly; the internal surface provides an internal flange to seat the swivel vent module. The internal flange forms a seating surface corresponding to a segment of a sphere; the seating surface thus adapts to receive the surface of the ball cylinder.

In operating the swivel vent module, available air supply is routed through the actuator cylinder; the valve disk, and depending on its axial extension, will admit or block the air flow.

In the pulled out, or open position, the actuator cylinder becomes extended so as to provide increased control over air flow direction. This open position also tends to increase air flow velocity by providing a change in diameter between the ball cylinder and the actuator cylinder, thereby creating a venturi effect.

The prime objective of this invention is to provide an improved gas flow control assembly in which restrictions to gas flow are minimized.

It is a another object of this invention to provide an improved gas flow control assembly which is linearly actuated.

It is an additional object of this invention to provide an improved gas flow control assembly which may be inexpensively manufactured and easily assembled.

It is yet another object of this invention to provide an improved gas flow control assembly which is structurally rigid and safe.

It is still another object of this invention to provide an improved gas flow control assembly system which can be easily operated by a user.

The above and other objects, features and advantages of the present invention will become more apparent from the following description when making reference to the detailed description and to the accompanying sheets of drawings.

DETAILED DESCRIPTION OF A PREFERRED EMBODIMENT

Figure 1:
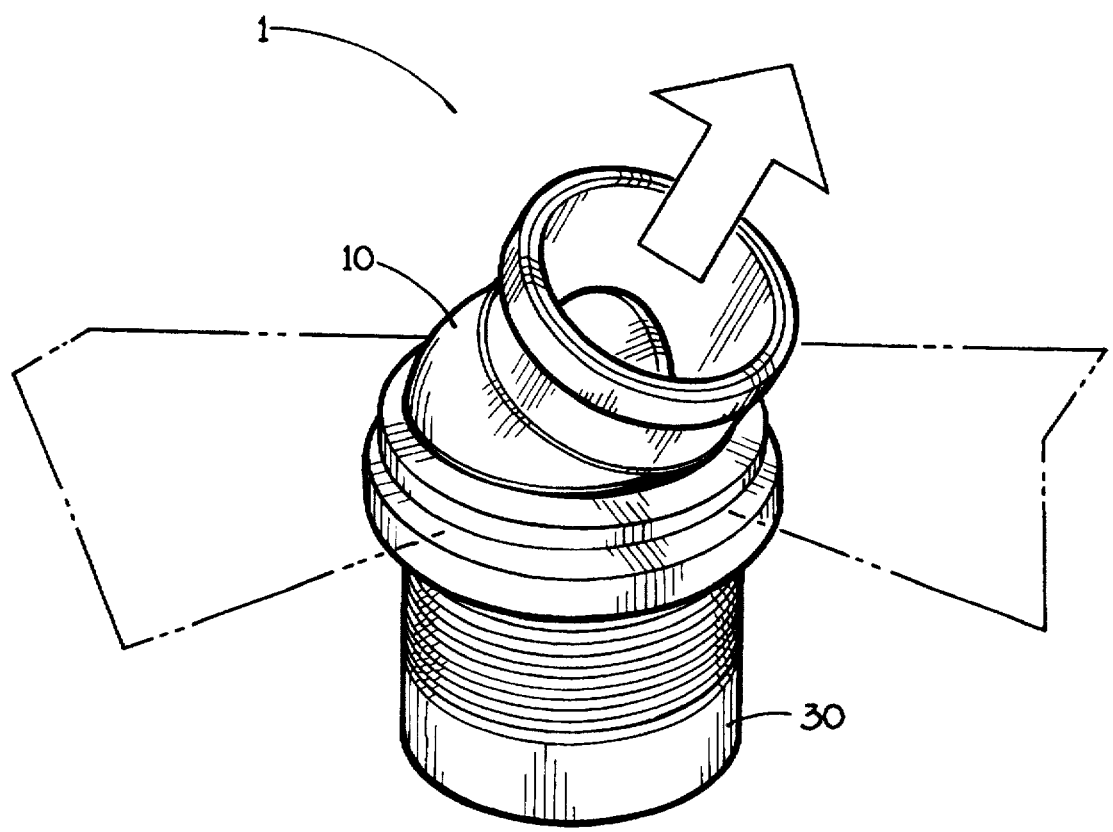
FIG. 1 shows a perspective view of the assembled preferred embodiment of this invention.

FIG. 1 shows a perspective representation of a gas flow control assembly 1 as a preferred embodiment of this invention with exit gas flow being depicted by an arrow. The structure consists generally of a swivel vent module 10 and a housing module 30. The swivel vent assembly 1 regulates the volume flow of air; the housing module 30 impart spacial control over the direction of air flow.

Figure 2:
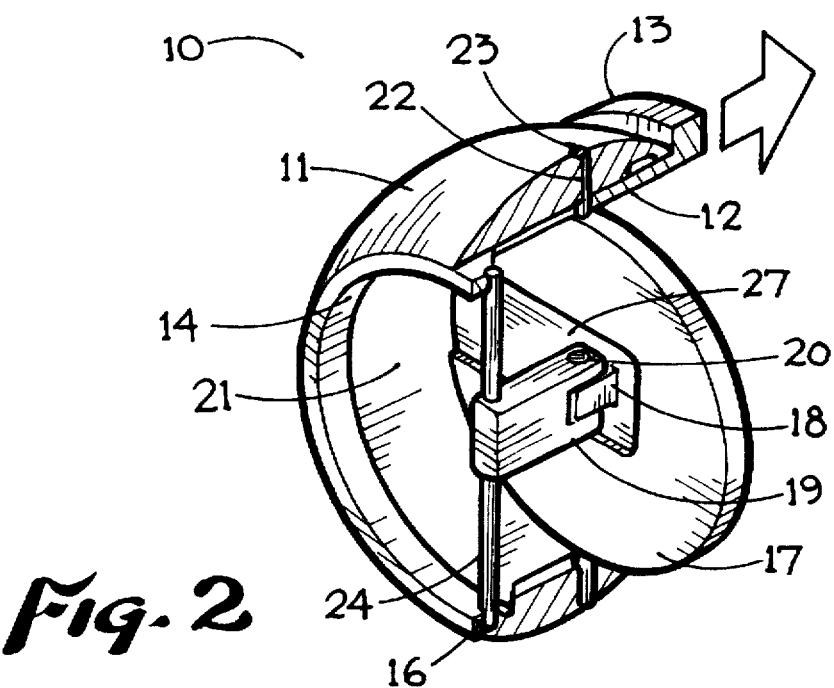
FIG. 2 presents an isometric view with the actuator and ball cylinders cross sectioned so as to show the valve disk in a closed position.
Figure 3:
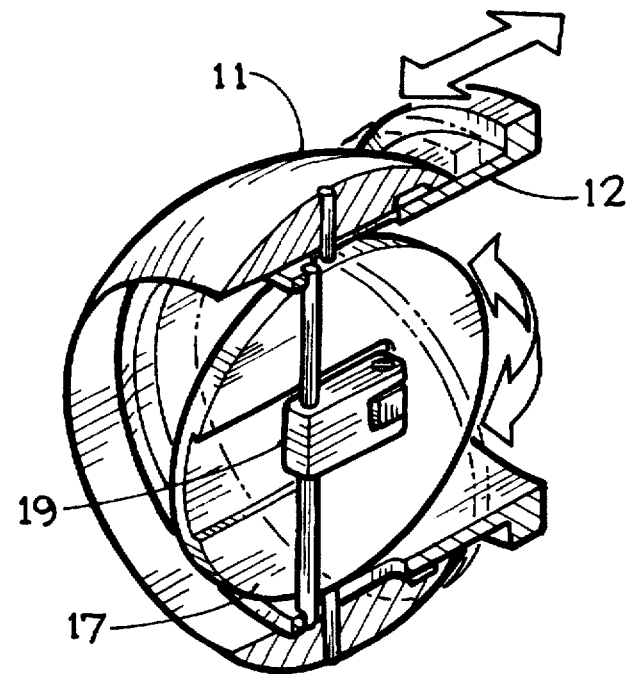
FIG. 3 presents the isometric view of FIG. 2 with the actuator and ball cylinders cross sectioned so as to show the valve disk in an open position.

FIG. 2 presents an isometric view with the actuator 12 and ball 11 cylinders cross sectioned so as to show the valve disk 17 in a closed position. FIG. 3 presents the isometric view of FIG. 2 with the actuator 12 and ball 11 cylinders cross sectioned so as to show valve disk 17 in an open position.

Figure 4:
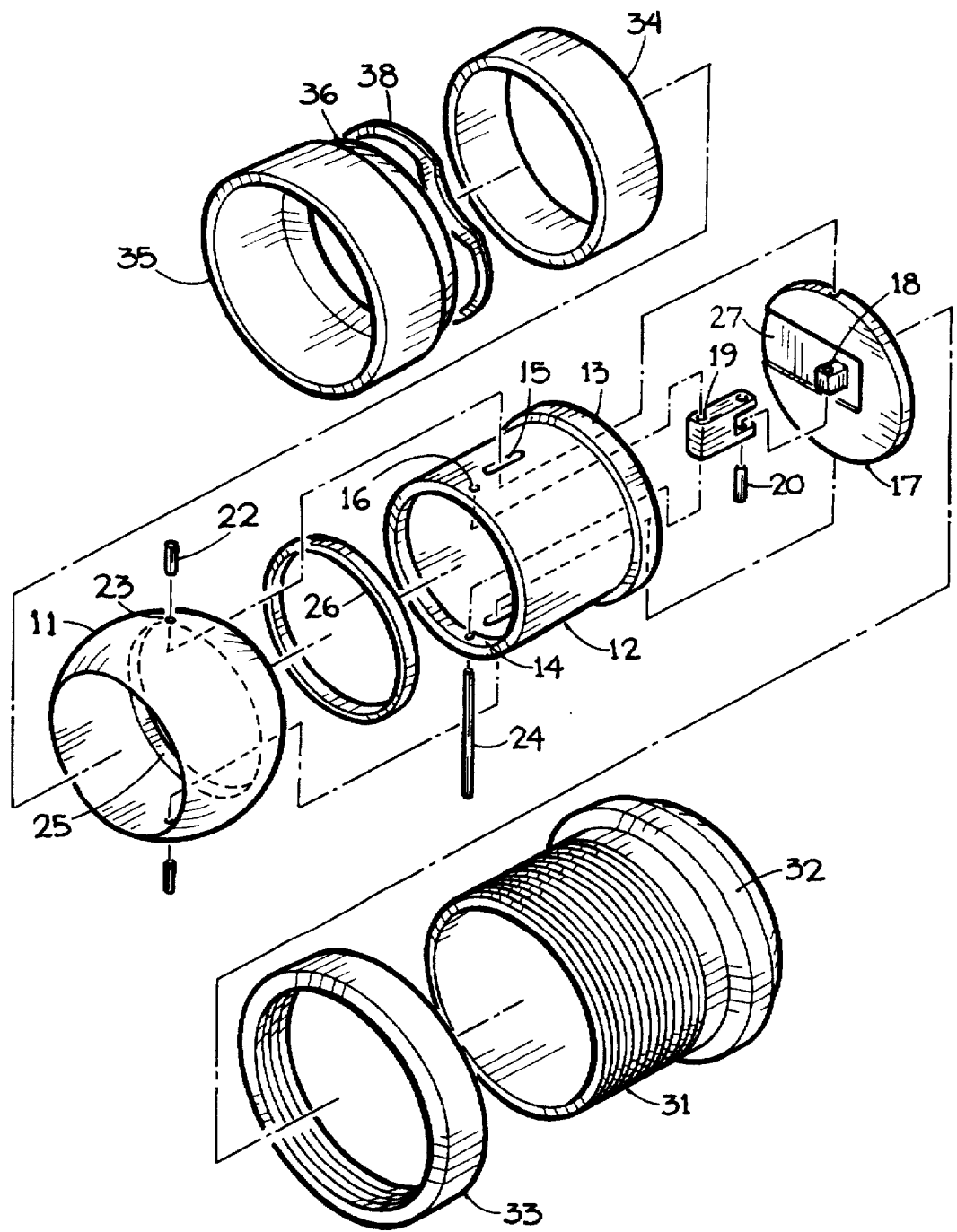
FIG. 4 shows an exploded perspective view of the total assembly of the preferred embodiment of this invention.

Referring to FIG. 2 & 3, swivel vent module 10 consists of four sub-modules: a ball cylinder 11, an actuator cylinder 12, a valve disk 17, and hinge elements 21. FIG. 4 shows an exploded view of the elements of the swivel vent assembly 1, and should be referred to for a detailed description of the swivel vent module 10.

The ball cylinder 11 is a cylindrical shell and constitutes an outer case of the swivel vent module 10. The outside surface of the ball cylinder 11 is shaped as a segment of a sphere; the inside surface is shaped as a straight cylinder and contains a circular sealant grove 25. A ring seal 26 is inserted into the sealant grove 25. A pair of disk pin bearings 23 are set in the shell wall and located diagonally across each other; the bearing axis is along the same diagonal. The diagonal is normal to a longitudinal axis of the shell; the longitudinal location of the bearings is substantially equidistant from the two ends of the shell.

The actuator cylinder 12 is a cylindrical shell with an outer diameter adapted to slidably conform to the inside of the ball cylinder 11 and the ring seal 26. A first end of the actuator cylinder 12 forms an actuator hand grip 13 by means of a flange extending radially outward from the longitudinal cylinder axis. Although a flange design is shown in the drawings, it will be recognized that many other designs, such as fingergrip, or knurled surfaces may be used. The actuator grip 13 also operates to stop further sliding motion of the actuator cylinder 12 into the ball cylinder 11. A second end of the actuator cylinder 12 forms an actuator pin support 14 by means of a flange extending radially inward toward the longitudinal cylinder axis.

A pair of actuator slots 15 perforate the shell of the actuator cylinder 12. The slots run parallel to the longitudinal axis of the actuator cylinder 12, are located diagonally opposite each other, and are centered substantially equidistant between the first and second ends of the actuator cylinder 12. Their position is thus substantially opposite the disk pin bearings 23 in the ball cylinder 11, and their lengths are sufficient to insure open access to the disk pin bearings 23.

A single actuator pin bearings 22 is set in the actuator pin support 14. The axis of the bearings is parallel with an axis through the disk pin bearings 23 and the actuator slots 15 and is off-set from a plane containing the actuator slots 15 and longitudinal axis of the actuator cylinder 12.

A circular valve disk 17 is adapted to fit inside the actuator cylinder 12. A pair of disk pins 22 are attached on the outside rim of the valve disk 17. The disk pins 22 extend diagonally outward through the actuator slots 15 and into the disk pin bearings 23 of the ball cylinder 11. The disk pins 22 are free to rotate in the disk pin bearings 23 thus imparting freedom of rotation of the valve disk 17 about a disk axis formed by the disk pins 22. A spacer grove 27 is cut in an inside flat surface of the valve disk 17.

A disk bracket 18, with disk bracket bearings 23, is affixed to the valve disk 17 in the spacer grove 27. Disk bracket 18 is placed flat on the inside flat surface of the valve disk 17 with the axis of the disk bracket bearings 28 parallel to the axis formed by the disk pins 22. The disk bracket 18 is linearly off-set relative to the axis formed by the disk pins 22. The linear off-set is such that a plane, which contains the disk bracket bearings 28 and the actuator pin bearings 16, is substantially parallel to the plane containing the actuator slots 15 and longitudinal axis of actuator cylinder 12.

The height of the disk bracket 18 gives a vertical off-set to the disk bracket bearings 28 from a plane containing the valve disk 17 and the disk pins 22. The vertical and linear off-sets are substantially equal.

Hinge elements 21 form actuation linkages of the swivel vent module 10. A disk bracket pin 20, with the disk bracket bearing 28 and a first bearing at a first end of disk lever 19, form a pivoting connection between the disk bracket 18 and a disk lever 19. An actuator pin 24, with actuator pin bearings 16 and a second bearing at a second end of disk lever 19, form a pivoting connection between the actuator cylinder 12 and the disk lever 19. FIG. 1 provides a perspective on the connection between the housing assembly 30 and the swivel vent assembly 1; while FIG. 4 shows the elements in detail.

A cylindrical housing module 31 contains the swivel vent module 10; the internal diameter provides sufficient clearance for substantially unrestricted relative movement. A top end 32 of the housing module 31 provides an external flange for mounting of the swivel vent assembly 1; the internal surface provides an internal flange to seat the swivel vent module 10. The internal flange forms a seating surface corresponding to a segment of a sphere; the seating surface thus adapts to receive the surface of the ball cylinder 11.

The external surface of housing module 31 is threaded. Internal threads on nut 33 adapts to the external threads on the housing module 31.

The outside diameter of bearing 34 adapts to the internal diameter of housing module 31 to establish a slidable fit when inserted. An inner end of the bearing 34 provides a seating surface shaped to a spherical surface; the surface adapts to the spherical surface of ball cylinder 11. The bearing 34 is positioned to maintain the assembled position of the swivel vent module 10 firmly against the internal flange of housing module 31.

Cylindrical adapter 35 has an external diameter substantially equal to that of the housing module 31. One end of adapter 35 is stepped down to a diameter to provide a press fit to the internal diameter of housing module 31. An axial restraint is utilized to maintain pressure on the swivel vent during rotational positioning. The length of the step insures correct positioning of an axial restraint member, such as wave washer 38, against the rear of the bearing to provide the correct pressure to maintain the position of the swivel vent assembly during rotational positioning.

The second end of adapter 31 projects outward from the housing module, and thus can be used to act as a nozzle by providing by a larger or smaller diameter relative to the minimum diameter of the valved opening. The operation of the swivel vent module 10 is illustrated by referring to FIG. 5 and FIG. 6. Available air supply is routed through the actuator cylinder 12; the valve disk 17, depending on its rotation, will admit or block the air flow. Two functional units are defined: a first unit consists of the ball cylinder 11, the valve disk 17, and the disk pins 22; a second unit consists of the actuator cylinder 12 and the hinge elements 21.

The elements of the first unit prevent relative linear motion by linking the disk pins 22 to the disk pin bearings 23, yet allows rotation of the valve disk 17 relative to the ball cylinder 11 about an axis running through the disk pin bearings 23. The elements of the second unit prevent relative linear motion by linking actuator pin 24 to the actuator pin bearings 16, and permits relative rotation between elements in hinge elements 21.

Relative motion between the two units are defined by actuator slots 15 and hinge pins 22. Thus linear motion of the disk pins 22 within the actuator slots 15 exists in response to linear motion of the actuator cylinder 12 relative to ball cylinder 11. However, the disk pins 22 are constrained to follow the actuator slots 15 during this motion. Therefore the slots restrict relative rotation and maintain a correct angular relationship between hinge elements 21 and valve disk 17.

Figure 5:
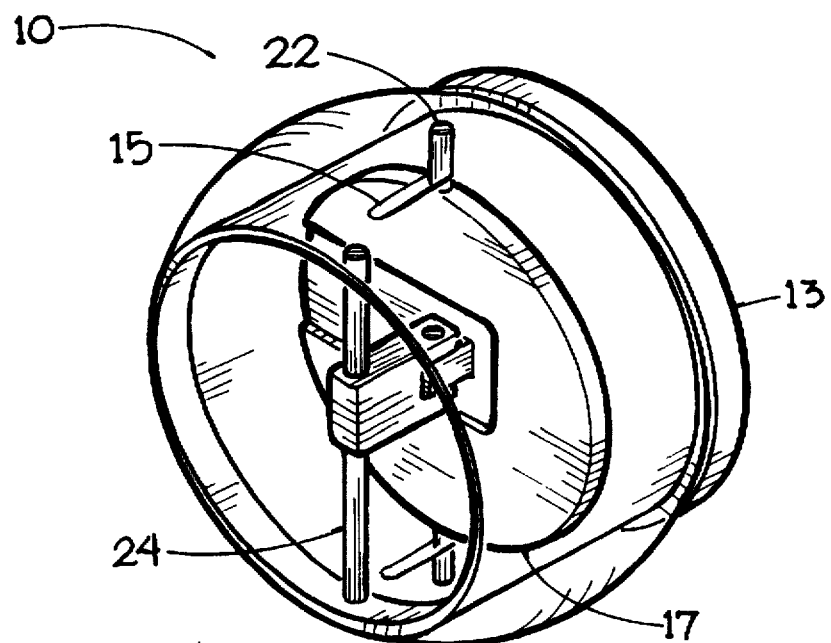
FIG. 5 shows a perspective view of the assembly of FIG. 2 within transparent actuator and ball cylinders cases.
Figure 6:
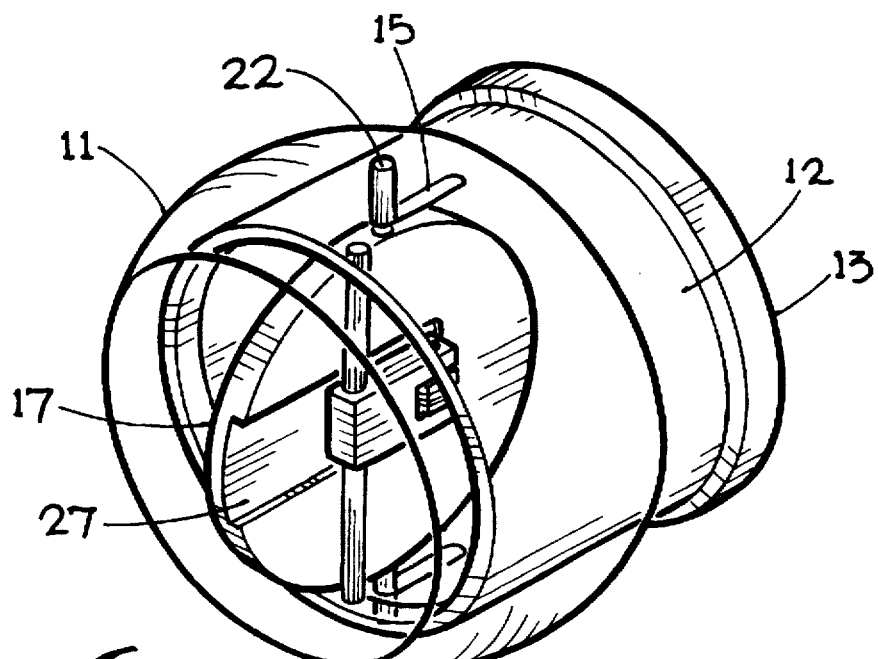
FIG. 6 shows a perspective view of the assembly of FIG. 3 within transparent actuator and ball cylinders cases.

The translation of linear motion of the actuator cylinder 12 to rotation of the valve disk 17 is apparent in FIG. 5 and FIG. 6.

FIG. 5 shows the swivel vent module 10 in a closed position with the actuator cylinder 12 fully inserted into the ball cylinder 11; the valve disk 17 is in a plane normal to the longitudinal axis of the actuator cylinder 12. The hinge elements 21 are aligned with the disk bracket pin 20 and therefore off-set linearly from the axis defined by the disk pins 22; this off-set provides a moment arm necessary to translate linear force and motion of the actuator cylinder 12 into torque and rotation of the valve disk 17.

FIG. 6 shows the swivel vent module 10 open with the actuator cylinder 12 partially withdrawn from the ball cylinder 11; the valve disk 17 is rotated into a plane aligned with the longitudinal axis of the actuator cylinder 12. In this position the moment required to rotate the valve disk 17 back toward a closed position is provided by the vertical off-set provided by the height of the actuator bracket pin 20.

The moment provided at positions and angles intermediate from those of FIG. 5 and FIG. 6 results from a combination of vertical and linear off-set.

The eventual operation of the swivel vent module 10 is illustrated in FIG. 1. The assembled position of the swivel vent unit 10 provides loose seating against the internal seating flange of housing module 31. The position of the swivel vent module is maintained by pressure from the wave spring disposed between bearing 34 and adapter 35.

The foregoing description and drawings were given for illustrative purposes only, it being understood that the invention is not limited to the embodiments disclosed, but is intended to embrace any and all equivalents alternatives, modifications and rearrangements of elements falling within the scope of the invention as defined by the following claims.

I claim:

1. A gas flow control assembly comprising:

a pressurized gas source having outside porting means;

an axially elongated cylindrical module housing having inside and outside surfaces and having gas inlet and outlet ends thereon;

means for attaching said outside surface of said cylindrical module housing to said gas source porting means so as to provide gas communication from said gas source to the gas inlet end of said cylindrical module housing for dispensing gas from the outlet end of said cylindrical module housing; and swiveling vent means comprising:

a ball cylinder means having a spherical outside surface and a cylindrical inside surface;

an actuator cylinder having first and second ends, and a cylindrical outside shell adapted to sidably conform to the inside diameter of said ball cylinder means;

cylindrical bearing means having an external diameter sidably fit within the inner diameter of the cylindrical module housing, said bearing having an inner end formed to provide a spherical surface to receive said spherical outside surface of said ball cylinder means whereby said ball cylinder means may be angularly rotated away from the centerline of said cylindrical module housing; and valve means connected between said actuator cylinder and said ball cylinder means so that sliding motion of said actuator cylinder toward said cylindrical module housing reduces gas flow through said cylindrical module housing, and sliding motion of said actuator cylinder extending away from said cylindrical module housing increases gas flow through said cylindrical module housing.

2. The gas flow control assembly as in claim 1, further comprising outlet nozzle adapter means, having an inner end attached to said cylindrical module outlet end, in order to provide an exit diameter change relative to the inner diameter of said ball cylinder means.

3. The gas flow control assembly as in claim 2, wherein said outlet nozzle adapter means includes external gripping means for manual adjustment of axial and rotational positioning.

4. The gas flow control assembly as in claim 2, further comprising axial restraint means disposed between said outlet nozzle adapter means and said bearing means so that axial pressure is maintained on the swivel vent means during rotational positioning.

5. The gas flow control assembly as in claim 4, wherein the axial restraint means includes a wave washer.

6. The gas flow control assembly as in claim 1, wherein said spherical outside surface of said ball cylinder means comprises a segment of a sphere.

7. The gas flow control assembly as in claim 5, wherein said inside surface of said ball cylinder means further comprises a sealant grove.

8. The gas flow control assembly as in claim 5, wherein said actuator cylinder further comprises stopping means to limit sliding motion of the actuator cylinder into the ball cylinder means.

9. The gas flow control assembly as in claim 1, wherein said valve means is disposed within said ball cylinder means.

10. The gas flow control assembly as in claim 9, wherein said valve means includes circular disk means to adjustably restrict axial gas flow.

11. The gas flow control assembly as in claim 10, wherein said circular disk means rotates about an axis perpendicular to the longitudinal axis of the cylindrical module housing.

12. The gas flow control assembly as in claim 11, wherein said actuation means includes means to translate linear motion of the actuator cylinder to rotation of said valve disk.

13. The gas flow control assembly as in claim 12, wherein said linear motion translation means includes mechanical linkage means to translate linear motion of the actuator cylinder to rotation of said valve disk.

14. The gas flow control assembly as in claim 13, wherein said linear motion translation means extends the length of the gas flow passage when the valve disk is rotated to increase gas flow.

* * * * *